Jan. 2, 1934.  L. TRIBOUT  1,942,347
LIQUID DISPENSING APPARATUS
Filed Dec. 29, 1932   2 Sheets-Sheet 2

L. Tribout
INVENTOR

By: Marks & Clerk
Attys.

Patented Jan. 2, 1934

1,942,347

UNITED STATES PATENT OFFICE 1,942,347

LIQUID DISPENSING APPARATUS

Lucien Tribout, Paris, France, assignor to Société d'Etude de Distributeurs Automatiques S. E. D. A., Paris, France Application December 29, 1932, Serial No. 649,379, and in France January 4, 1932

2 Claims. (Cl. 221—100)

This invention has for its object an improvement in apparatus for dispensing liquids in predetermined quantities, and particularly to gasoline dispensing apparatus.

These apparatus, in order to satisfy working conditions, must possess the following features:

1. Ruggedness of the parts and simplicity of the mechanism.
2. Positiveness of operation and inability of getting out of order.
3. Accuracy in the measurement of the quantities delivered.
4. Impossibility of intentionally or unintentionally modifying this measurement, and without leaving traces of the fraud or of the incorrect operation.

The device forming the subject-matter of the present invention has precisely for its object to allow of providing dispensing apparatus simultaneously satisfying all the above mentioned conditions.

Its essential advantages are particularly the following:

1. The float and the parts it controls essentially and positively participate in the operation of the dispensing apparatus, which operation is completely checked by the elmination of the said float or when the latter is held stationary in any position.
2. The float intervenes in the operation of the dispensing apparatus, not by its position or positions, but by its displacements, and more explicitly by its downward stroke, which can begin only when all the liquid contained in the gauging chamber has flowed into the chamber in which the said float moves.

The invention is characterized by the following points:

1. Utilization of an auxiliary slide valve, controlled by the downward movement of a float, allowing the pressure of the liquid delivered towards a large gauging device to be exerted on a piston coupled to the dispensing piston, and acting as auxiliary motor for the return of the said dispensing piston from the emptying position of the gauging chamber to the position of admission in the said chamber.
2. Interposition, between the gauging chamber and a large intermediate vessel forming a reserve of liquid and from which the liquid flows to the consumer, of an auxiliary bowl of smaller capacity arranged at a higher level than the said intermediate vessel, so as to render the operation of the float independent of the speed of delivery to the consumer.

A form of carrying out the invention is described hereinafter, by way of example only, with reference to the accompanying drawings in which.

Figure 1:
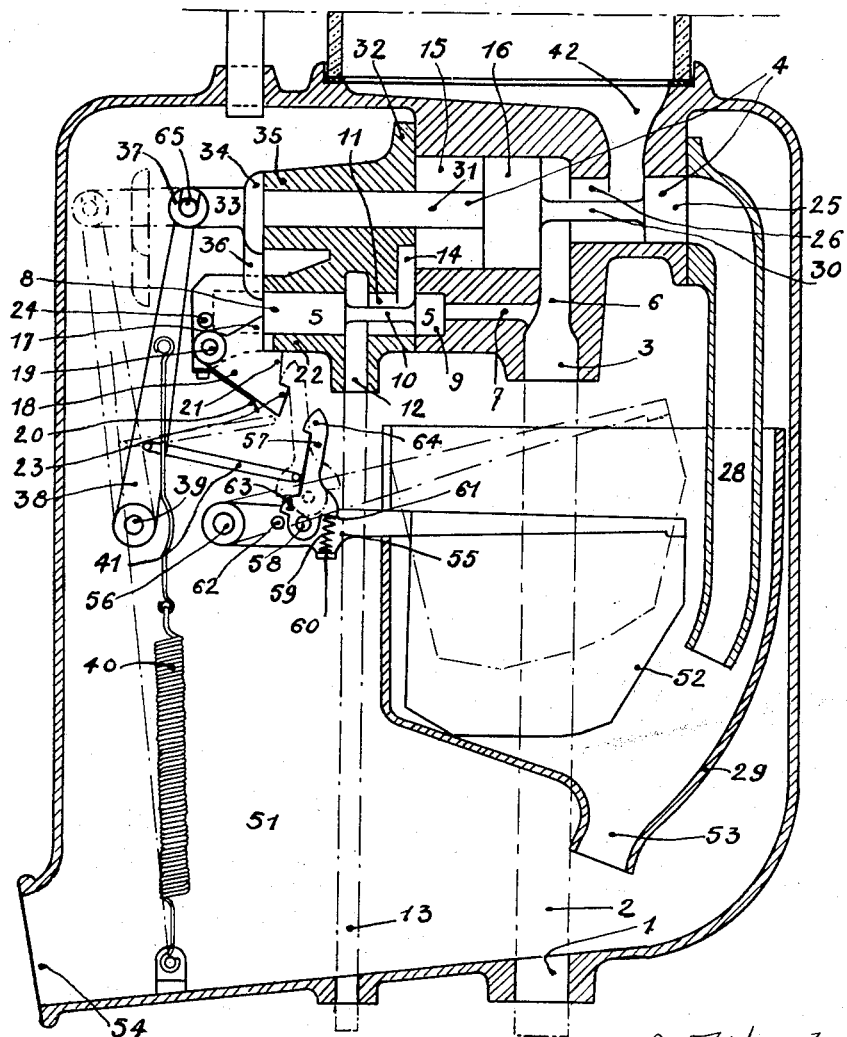
Fig. 1 is a section made through the vertical axis of the apparatus.

The liquid to be distributed, delivered by the feed pump (not shown), reaches the dispensing apparatus through a connection 1, a pipe 2 (shown in dot and dash lines as not being included in the sectional plane), and an orifice 3 giving access to a main slide valve 4 and an auxiliary slide valve 5. From this orifice 3, the conduit divides into two branches, one, 6, leading to the slide valve 4, the other, 7, leading to the slide valve 5.

The auxiliary slide valve 5 is composed of two pistons 8 and 9 rendered rigid together by a rod 10 and moving in a cylindrical chamber 11. The latter is in communication, through a port 12, with a piping 13 returning the liquid to the cistern, and through a port 14, with the variable space bounded, in the left-hand portion of the chamber 15 where the piston 16 moves, by this piston itself.

The thrust of the liquid delivered by the pump being exerted, as soon as the latter is in action, on the right-hand face of the piston 9, the slide valve 5 is constantly urged towards the left, but it can be held stationary in the position shown in Fig. 1, by the heel-piece 17 of a locking member 18 rocking about a pivot pin 19, and urged, in counter-clockwise direction, by an antagonistic spring 20. The locking member 18 is moreover provided with an abutment 21, which limits its rotation under the action of the spring 20 by bearing on the member 22, and with a claw 23 with which a hook 64 can come in engagement, as indicated later on, the downward movement of this hook then causing the rotation of the locking member 18 and the release of the slide valve 5. The displacement of this slide valve towards the left is then limited by a cross member 24.

The slide valve 4 is composed of a piston 25 acting as a distributing member which, by its displacement in a chamber 26, alternately puts the gauging chamber 27 in communication either with the liquid inlet orifice 3, or with the pipe 28 discharging into the bowl 29.

This piston 25 is coupled, by a rod 30, to a second piston 16, of larger diameter, moving in a cylindrical chamber 15. Finally, this unit is provided with a left-hand extension constituted by a cylindrical rod 31 which, passing through the bottom 32, extends in the chamber 51 where it terminates in a head 33. This head is provided with an abutment-ring 34 which, by coming in contact with the guide member 35, limits the movement of the slide valve 4 towards the right, at the same time that a nose 36, carried along by the movement of this piston, and coming in engagement, during its displacement from left to right, with the piston 8 (which has previously moved out of the chamber 11), restores it to the position shown in the figure.

Finally, the head 33 also carries a finger 65, which permanently extends in the fork 37 of a lever 38 rocking about a pivot pin 39, and is constantly urged by a coil spring 40.

The lever 38 carries a side finger 41, which, when this lever occupies the position shown in Fig. 1 (full line position), comes in contact with a pawl 57, and, pushing it towards the right, releases the hook 64 from the claw 23 if these two members are in engagement, and prevents this engagement if they were not already engaged with each other.

The liquid admitted in the gauging chamber 27 under the thrust of the feed pump, rises in this chamber until it reaches a float 44 supporting a valve 47 and guided by a tail piece 45 sliding in a guide member 46. The float progressively lifts, and when the chamber 27 is full, the valve 47 comes to rest on its seat 48 closing the orifice 43 and preventing the passage of the liquid. During all the time the chamber 27 is being filled, the air displaced by the liquid has been able to escape through the orifice 43, from which it passes into the chamber 49, and then returns, through a pipe 50, to the chamber 51 with which an exchange of atmosphere alternately takes place in both directions during the operation of the apparatus.

When the valve 47 closes, the increase of pressure taking place on the down side of the feed pump causes, according to the processes described later on, the distributing slide valve 4 to come in the position shown in Fig. 2, where it allows the chamber 27 to be emptied. The latter is in fact put in communication with the discharge pipe 28, which opens in the bowl 29, arranged within the chamber 51, and perforated at its lower part with an orifice 53.

From the bowl 29, the liquid can flow, partly through the orifice 53, partly by overflowing, into the chamber 51, from which it finally issues through the connecting branch 54 to which is secured the flexible hose distributing the liquid to the consumer.

In the bowl 29 moves a float 52, secured to a lever 55 rocking about a pivot pin 56. This lever carries a pawl 57, rocking about a pivot pin 58, and urged to rotate in a counter-clockwise direction by a spring 59 bearing, on the one hand, on an abutment 60 and, on the other hand, on a heel piece 61 of the said pawl. The rotation of the pawl 57 is limited by an abutment 62 with which a claw 63 engages.

Finally, the pawl 57 terminates, at its upper part, in a hook 64 which can come in engagement with the claw 23 of the locking member 18.

The operation of this structure is as follows:

All the members occupying the position shown in Fig. 1 (full line position), the liquid delivered by the feed pump, is admitted in the apparatus through the connecting branch 1, pipe 2 and orifice 3, then through the port 6, chamber 26 and orifice 42, it enters the gauging chamber 27 it progressively fills.

When the level of the liquid reaches the upper part of the chamber 27, the float 44 rises and presses the valve 47 on its seat 46, closing the orifice 43. The feed pump continuing its action, the pressure rises on the down side of this member, the liquid accumulating therein in a chamber or space having no longer any issue. This pressure is exerted both on the left-hand face of the piston 25 and on the right-hand face of the piston 16, these two pistons conjointly acting as a single differential piston, the resulting thrust towards the left being equal to the difference of the pressures exerted on both pistons 16 and 25.

Figure 2:
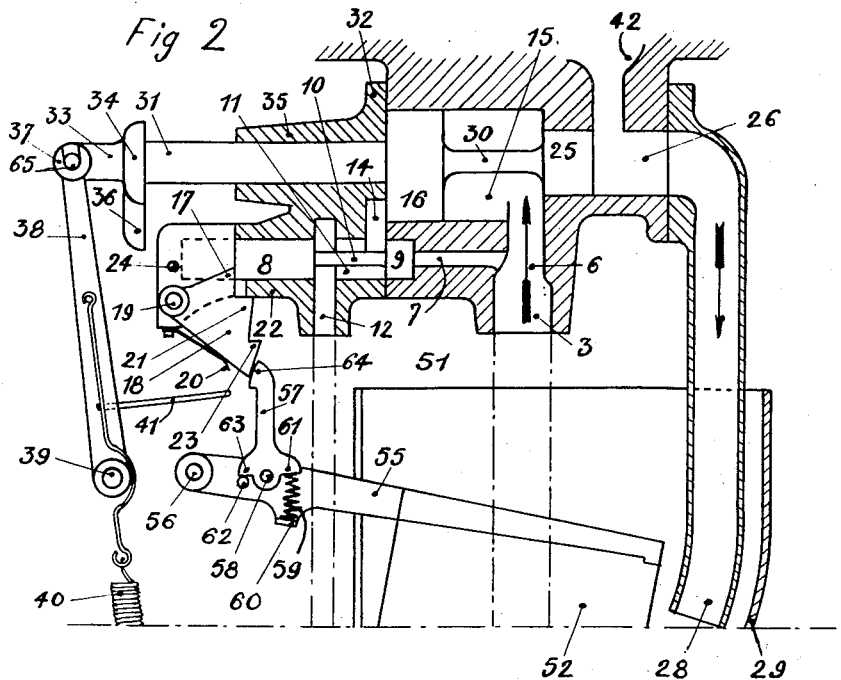
Figs. 2 and 3 illustrate two different positions of the main parts of the dispensing apparatus, at two successive phases of one and the same dispensing operation.

When this thrust overcomes the frictions to which is added the axial component of the stress exerted by the spring 40, through the medium of the lever 38, on the head 33, the entire slide valve 4 moves towards the left and comes in the position shown in Fig. 2. It is to be noted that, during this displacement, the angle formed by the pulling axis of the spring 40 with the axis of the lever 3 constantly decreases until it is completely annulled in the extreme left-hand position, so that the antagonistic stress which would tend to brake or check the displacement of the slide valve 4 towards the left also constantly decreases to the end of this movement. It is even possible, as illustrated in Fig. 1, to adjust the position of the parts in such a manner that at the end of the movement, the action of the spring 40 is deducted from the frictional resistance. The advantage of this arrangement is to prevent the slide valve 4 being held stationary in an intermediate position between the extreme positions, in case the action of the feed pump would be interrupted during the time this slide valve passes from one of these extreme positions to the other.

The displacement of the slide valve towards the left has determined at the same time the rotation of the lever 38, which comes in the position shown in Fig. 2, in which the finger 41, displaced towards the left, can no longer have any action on the pawl 57. The latter, urged by the spring 60, presses, through the medium of the head of its hook 64, on the incline which constitutes the lower part of the claw 23 of the locking member 18, as illustrated in Fig. 2.

During this entire phase of the distribution, the pressure of the pump acts indeed on the right-hand face of the piston 9, but the slide valve 5, abutting at the left against the locking member 18, cannot move and remains in the position shown in Fig. 1, in which the left-hand portion of the chamber 15 is in communication with the pipe 13 returning the liquid to the cistern, and is consequently at atmospheric pressure.

The entire mechanism being therefore in the position shown in Fig. 2, the liquid accumulated in the chamber 27 can flow, through the orifice 42, chamber 26 (closed at the left by the piston 25) and the discharge pipe 28, into the bowl 29. The emptying orifice 53 at the bottom of this bowl has such dimensions that the speed of flow, through the pipe 28 (which usually has an elliptical cross section), of the liquid coming from the chamber 27 is and remains during the entire period of emptying greater than the speed of flow of the liquid contained in the bowl 29, through the said orifice 53. It results therefrom that the emptying of the chamber 27 causes the accumulation, and consequently, the rising of the liquid level, in the bowl 29, this rising of the level continuing until the bowl overflows. The ratio of the speeds of flow in the bowl 29 and outside the latter, as well as the ratio of the capacities of the chamber 27 and bowl 29 are such that this overflowing always takes place, with a certain margin, before the emptying of the chamber 27 is completed.

The rising of the liquid in the bowl 29 causes the float 52 to rise, thus lifting the pivoted pawl 57. In this movement, the head of the hook 64 slides along the incline of the claw 23 of the locking member 18, until, having reached the position indicated in dot and dash lines in Fig. 1, the hook and claw come in engagement with each other.

Figure 3:
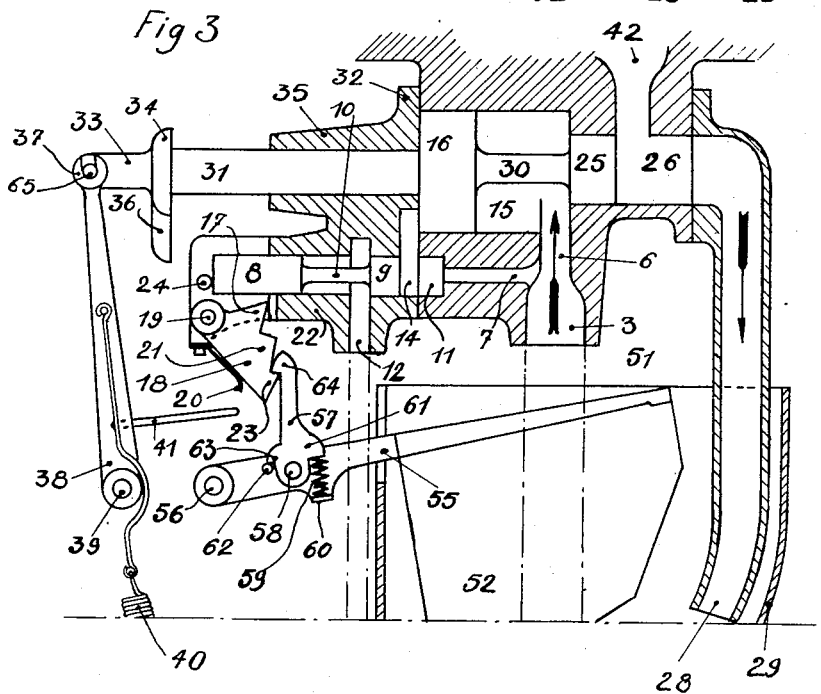

When the chamber 27 has been emptied, the flow of the liquid contained at this moment in the bowl 29 continuing through the hole 53 in the chamber 51, the level lowers in this bowl, the float also lowers, and the hook 64 carries along in its downward movement the locking member 18 which rotates about the pivot pin 19, thus compressing the spring 20. As soon as the heel piece 17 of the locking member 18, which held the slide valve 5 in its extreme right-hand position, has moved away, the pressure exerted by the pump pushes this slide valve towards the left and causes it to come in the position shown in Fig. 3. The liquid delivered by the pump is then admitted, through the port 14, on the left-hand face of the piston 16, which is subjected on both its faces to the same pressure. The entire slide valve 4 will therefore operate as a differential piston constituted by two pistons, one of which is the distributing piston 25, and the other would have the section of the cylindrical rod 31. It is then the action of the piston 25 which is predominant owing to its larger cross section, and the entire slide valve 4 moves towards the right, again putting the chamber 27 in communication, through the orifice 42 and the chamber 26, with the delivery of the feed pump.

Owing to the movement of the slide valve 4 towards the right, the nose 36 has come in contact with the left-hand face of the piston 8, thus pushing the slide valve 5 towards the right for restoring it to the position shown in Fig. 1. The resulting thrust of the liquid on the differential piston actuating the slide valve 4 is in fact in sufficient excess to overcome the thrust exerted by the said liquid on the piston 9. Moreover, near the end of the movement of the slide valve 4 towards the right, the action of the spring 40, which, this time, is exerted in the same direction as the driving thrust, increases and even becomes sufficient for replacing the latter near the end of the displacement at the moment when, the piston 25 uncovering the port 42, the admission of liquid in the chamber 27 causes the pressure to fall on the down side of the pump.

At the same time as the nose 36 has begun to push back the slide valve 5, the finger 41 of the lever 38 has come in contact with the pawl 57, causing it to rotate in a clockwise direction by compressing the spring 59. During this movement, the hook 64 disengages from the claw 23 which it releases, and the locking member 18, urged upwardly by the spring 20, resumes, (as soon as the piston 8 reaching its extreme position towards the right allows this rotation) the position shown in Fig. 1, in which its heel-piece 17 holds the slide valve 5 stationary. The entire mechanism has then been restored to the initial position and is ready for distributing a further quantity of liquid corresponding to the volume of the gauged chamber.

The operation of the demonstrative apparatus, (dial or totalizer) can be controlled by the alternate displacements of the lever 38, causing a rotation of the spindle 39 rigid with this lever and rotating in supports.

I claim:

1. In a liquid dispensing apparatus, a gauging container having an air vent and provided with a float valve to close the vent when liquid reaches a predetermined level in the container, in combination with a liquid receptacle mounted below the gauging container and provided with a discharge opening in its lower part, supply and discharge pipes communicating with the lower part of the gauging container through a common connection, said supply pipe leading from a source of liquid under pressure and said discharge pipe leading into the lower receptacle, said discharge pipe having a greater discharging capacity than that of the discharge opening of the lower liquid receptacle, a hinged float mounted in the lower receptacle, a differential pressure-responsive valve mounted in the common connection of the supply and discharge pipes with the gauging container, said differential valve being responsive to the normal pressure of the liquid in the connection to open the supply pipe and to close the discharge pipe, said differential valve operating under an excess of pressure to reverse its position to close the supply pipe and to open the discharge pipe for the discharge of liquid from the gauging container into the lower receptacle, the excess of pressure being built-up by the closing of the air vent in gauging container by the float valve, auxiliary means coacting with the differential valve to operate said valve, and mechanism actuated by the movement of the float in the lower receptacle for controlling the operation of the differential valve.

2. In a liquid dispensing apparatus as in claim 1, in which the auxiliary means coacting with the differential valve includes an auxiliary discharge pipe and a branch pipe leading from the liquid supply pipe and the casing of the differential valve having a port leading from the rear of the valve piston to the branch pipe and to the auxiliary discharge pipe, a slide valve responsive to the liquid pressure in the branch pipe and controlling said port to open or close the rear side of the differential valve piston to the auxiliary discharge pipe or to the liquid pressure in the branch pipe, and mechanism actuated by the float in the lower receptacle for controlling the movement of the slide valve.

LUCIEN TRIBOUT.